United States Patent [19]

Okado et al.

[11] Patent Number: 4,558,674

[45] Date of Patent: Dec. 17, 1985

[54] KNOCK CONTROL APPARATUS EQUIPPED WITH ALTITUDE COMPENSATION FUNCTION

[75] Inventors: Terumi Okado, Katsuta; Noboru Sugiura, Mito, both of Japan

[73] Assignee: Hitachi, Ltd., Tokyo, Japan

[21] Appl. No.: 588,215

[22] Filed: Mar. 12, 1984

[30] Foreign Application Priority Data

Mar. 15, 1983 [JP] Japan .................................. 57-43713

[51] Int. Cl.⁴ .............................................. F02P 5/04
[52] U.S. Cl. ..................................... 123/425; 123/412
[58] Field of Search ....................... 123/412, 435, 425

[56] References Cited

U.S. PATENT DOCUMENTS

| 4,002,155 | 1/1977 | Harned | 123/425 |
| 4,106,447 | 8/1978 | West | 123/425 |
| 4,133,475 | 1/1979 | Harned | 123/425 |
| 4,175,520 | 11/1979 | Russell | 123/412 |

FOREIGN PATENT DOCUMENTS

| 2856639 | 10/1980 | Fed. Rep. of Germany | 123/412 |
| 2039994 | 8/1980 | United Kingdom | 123/412 |
| 2069597 | 8/1981 | United Kingdom | 123/412 |

*Primary Examiner*—Ronald B. Cox
*Attorney, Agent, or Firm*—Antonelli, Terry & Wands

[57] ABSTRACT

A knock control apparatus equipped with an altitude compensation function is disclosed. The apparatus comprises a knock sensor fitted to an internal combustion engine and detecting the mechanical oscillation of the engine; a background signal detection circuit discriminating the background level signal of the knock signal from the output signal of the knock sensor; a comparator for comparing the output signal of the knock sensor with the background signal and detecting knock and the intensity of knock; and a knock control circuit sequentially advancing the ignition timing of the internal combustion engine towards the maximum advance angle position and retarding the ignition timing in accordance with the occurrence of knock and its intensity so as to control and optimize the ignition timing of the engine. The knock control apparatus further includes an atmospheric pressure sensor and changes the maximum advance angle position of the ignition timing in accordance with the output signal of this atmospheric pressure sensor.

9 Claims, 27 Drawing Figures

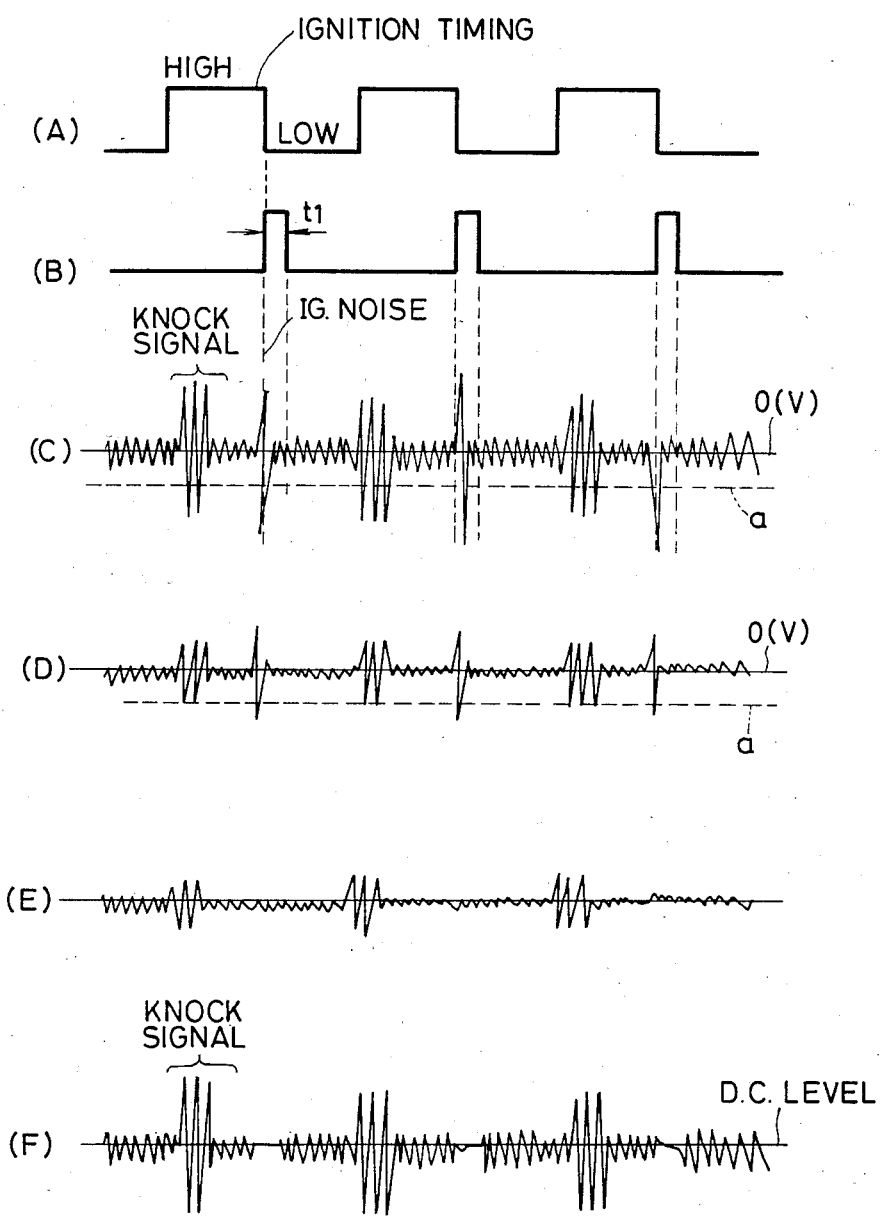

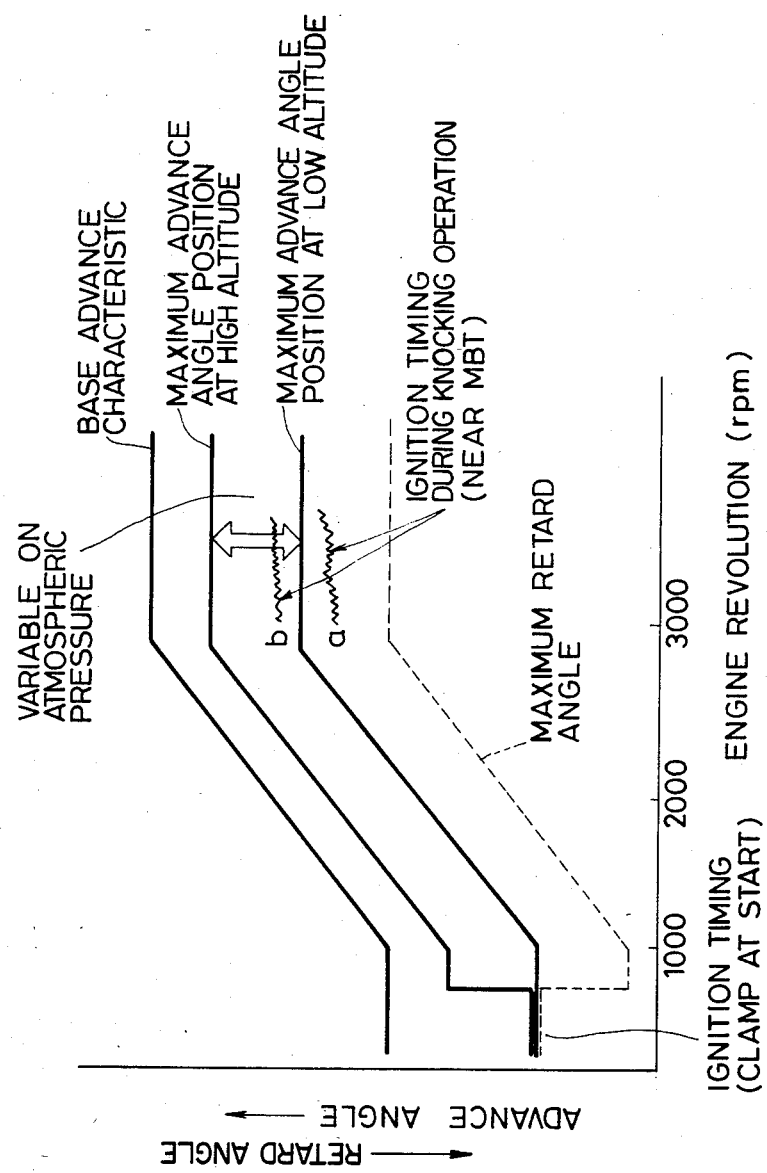

KNOCK CONTROL APPARATUS EQUIPPED WITH ALTITUDE COMPENSATION FUNCTION

BACKGROUND OF THE INVENTION

This invention relates generally to a knock control apparatus and more particularly, to a knock control apparatus equipped with an altitude compensation function capable of appropriately effecting knock control even at a high altitude irrespective of the speed of an engine.

Knock occurring in an engine is accompanied by knocking sound which reduces the engine performance and can cause the drop of the engine output due to the occurrence of reverse torque or the breakdown of the engine due to overheating. Knock is closely related to ignition timing. It is well known that from the engine characteristics, the engine output can be maximized by setting the ignition timing or spark advance angle immediately before knock. Accordingly, if the spark advance angle is reduced so as to avoid the occurrence of knock, the engine output will drop, and the ignition timing must be controlled to the position immediately before the occurrence of knock.

It is also known generally that since the charge in a cylinder becomes lower when driving at higher altitudes than at lower altitudes, the knock occurrence range of the ignition timing advances much more in high altitudes than in the low altitudes. Hence, the engine efficiency can be improved by setting the ignition timing, when driving in high altitudes, at an angle much more advanced than when driving in at low altitudes.

On the other hand, it is already known to carry out altitude compensation of the spark timing by use of a diaphragm or the like in order to control more accurately the ignition timing at high altitudes, as disclosed in Japanese Patent Laid-Open No. 84866/1980, for example. As described above, however, when effecting knock control, the ignition timing must be precisely controlled to the position closest to the knock range by feeding back the knock signal. It has been therefore difficult to apply the mechanical altitude compensation of the prior art described above as such.

SUMMARY OF THE INVENTION

It is therefore an object of the present invention to provide a knock control apparatus which can control most appropriately and most precisely the ignition timing even when driving in at high altitudes.

The object of the invention described above can be accomplished by changing a maximum advance angle position obtained by a knock control apparatus in accordance with the output from an atmospheric pressure sensor.

In accordance with the present invention, since the maximum advance angle position obtained from the knock control apparatus changes with change in the atmospheric pressure, the ignition timing which is determined by knock control does not change unnecessarily so that heavy knock due to an excessive advance angle can be avoided and knock control can be made accurately and delicately.

BRIEF DESCRIPTION OF THE DRAWINGS

FIG. 16 is an operation diagram showing the operation of the lowest voltage generation circuit shown in FIG. 14.

DESCRIPTION OF THE PREFERRED EMBODIMENTS

Figure 1:
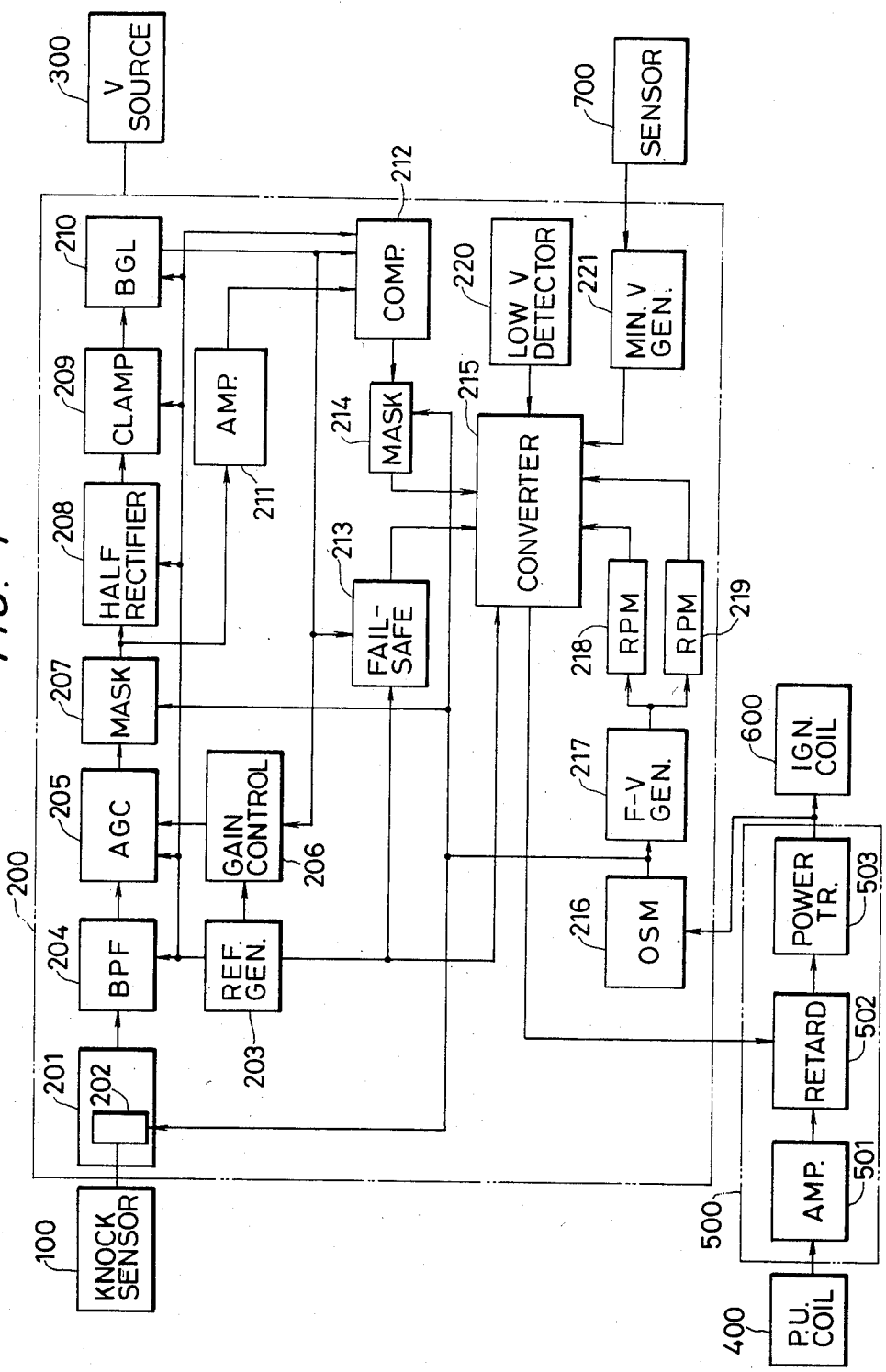
FIG. 1 is a block diagram showing the overall construction of a knock control system in accordance with the present invention.

In FIG. 1, a knock control system comprises a knock sensor 100 for detecting a knock signal, an atmospheric pressure sensor 700 for detecting the atmospheric pressure, a knock control apparatus 200 for receiving the knock detection signal produced from the knock sensor 100 and the atmospheric pressure signal produced from the atmospheric pressure sensor 700 and generating a control signal for controlling the ignition timing of an ignition coil 600, a pick-up coil 400 for detecting the ignition timing of the ignition coil 600, and a non-contact ignition device 502 for actuating the ignition coil by the outputs from the pick-up coil 400 and knock control apparatus 200 and generating a feedback signal to the knock control apparatus 200.

The basic operation of the knock control apparatus 200 is that it receives the detection signal of the knock sensor 100 and the output signal of the non-contact ignition device 500 and controls the non-contact ignition device 500 in accordance with knock so as to let it advance or retard angle control.

The knock control apparatus 200 comprises an amplifier 201 having an ignition noise cut circuit 202 which consists of a gate circuit for eliminating the ignition noise occurring in synchronism with the ignition timing; a band pass filter (BPF) 204 for taking out a specific frequency component from the knock detection signal; a gain variable amplification circuit (AGC) 205 for receiving the output BPF 204 and amplifying the signal at an amplification gain proportional to the input signal ratio by means of the feedback signal; a mask circuit 207 for masking the output of the AGC circuit 205 for a predetermined timing period; a half wave rectification circuit 208 for the half wave rectification of the signal from the AGC circuit 205 via the mask circuit 207; a knock signal clamp circuit 209 for clamping the signal lest a large knock signal mixes with the half wave rectification signal from the half wave rectification circuit 208 to exert adverse influences upon the background level; a BGL detection circuit 210 for obtaining the background level (BGL) to obtain the mean value of the knock signals; a gain control circuit 206 for amplifying the output of the BGL detection circuit 210 and applying the feedback signal to the AGC circuit 205; a signal amplification circuit 211 for amplifying the output of the mask circuit 207; a comparator 212 for comparing the output voltage of the BGL detection circuit 210 with the output signal of the signal amplification circuit 211 and generating a retard angle signal proportional to knock; a mask circuit 214 for masking the output of the comparator 212 at a predetermined timing and producing its output; a knock signal voltage conversion circuit 215 for integrating the output of the mask circuit 214 and producing an output value corresponding to the retard angle signal proportional to knock; a fail-safe circuit 213 for detecting the open circuit of the knock sensor 100 and generating a signal for retarding the angle of the ignition timing; a monostable circuit 216 for generating a signal of a predetermined pulse width in synchronism with the cut-off of the ignition coil 600 (that is, in synchronism with the base current of a power transistor 503) by means of the signal from the non-contact ignition device 500; a frequency-voltage (F-V) generator 217 for producing a voltage value proportional to the number of revolutions of the engine by means of the output pulse from the monostable circuit 216; a first number-of-revolutions detection circuit 218 for producing a signal by means of the output from the F-V generator 217 when the number of revolutions is 2,400 rpm or more; a second number-of-revolutions detection circuit 219 for producing a signal when the number of revolutions is 350 rep or less; a lowest voltage generation circuit 221 for changing the lowest output voltage value of the knock signal conversion circuit 215 in accordance with the output voltage of the atmospheric pressure sensor 700; and a reference voltage generation circuit 203. Reference numeral 300 denotes a power source voltage circuit which applies a constant voltage to the knock control apparatus 200 and reference numeral 220 denotes a low voltage detection circuit which detects the drop of the power source voltage below a predetermined minimum allowable voltage.

The non-contact ignition device 500 comprises an amplifier 501 for shaping the waveform of the output signal of the pick-up coil 400, a retard circuit 502 for controlling the ignition timing in accordance with the output voltage of the knock control circuit 200 and a power transistor 503 for cutting off the current flowing through the primary side of the ignition coil 600 and generating a high voltage on the secondary side.

The atmospheric pressure sensor 700 comprises, for example, a diaphragm having a vacuum reference pressure chamber and an atmospheric pressure chamber, a semiconductor pressure sensor or the like. The sensor 700 produces an output voltage which changes with the pressure difference between the reference pressure and the atmospheric pressure. The output characteristics of such an atmospheric pressure sensor 700 are such that it produces the output voltage of 1.75 V at low altitudes of about 300 m above above sea level (below 760 mmHg) and 3 V near a 2,500 m above sea level (640 mmHg). The output of the atmospheric pressure sensor 700 is applied to the knock control apparatus 200 via the lowest voltage generation circuit 221.

Next, each constitutent element of the knock control apparatus 200 will be described in detail.

Figure 2:
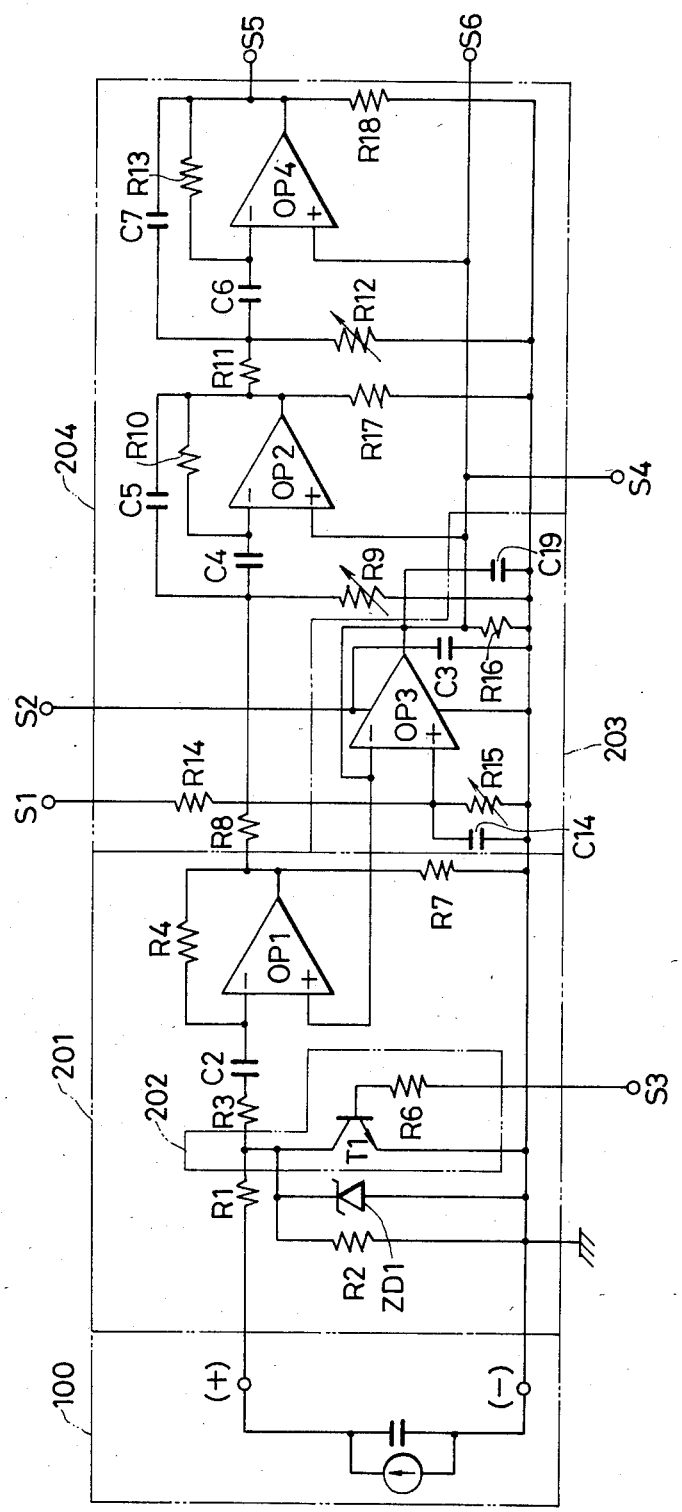
FIGS. 2 through 8 are circuit diagrams showing in detail the principal blocks shown in FIG. 1.

FIG. 2 shows in detail the circuits of the knock sensor 100, amplifier 201, ignition noise cut circuit 202, reference voltage generator 203 and band pass filter (BPF) 204.

The knock sensor 100 is a capacitance type sensor using a piezoelectric element and consists equivalently of a parallel circuit of a capacitor C and a constant current source as shown in the drawing.

A resistor R1 is connected to the (+) terminal of the knock sensor 100 and a resistor R2, a resistor R3, the cathode of a zenor diode ZD1 and the collector of a transistor T1 are connected to the other end of this resistor R1. Each of the other end of the resistor R2, the anode of the zenor diode ZD1 and the emitter of the transistor T1 is grounded. The base of the transistor T1 is connected to the output terminal S3 of the monostable circuit 216 via a resistor R6. The other end of the resistor R3 is connected to the (−) input terminal of an operational amplifier OP1 via a capacitor C2. Negative feedback is applied to this operational amplifier via a resistor R4, and resistors R7 and R9 are connected to the output terminal of the operational amplifier OP1. The other end of the resistor R7 is grounded. Capacitors C4, C5 and a variable resistor R9 are connected to the other end of the resistor R8.

The amplifier 201 consists of the resistors R1, R2, R3, R4, R7, the capacitor C2 and the operational amplifier OP1 while the ignition noise cut circuit 202 consists of the transistor T1 and the resistor R6.

The other end of the variable resistor R9 is grounded. The other end of the capacitor C4 is connected to the (−) input terminal of the operational amplifier OP2 and the other end of the capacitor C5 is connected to the output terminal of the operational amplifier OP2. Negative feedback is applied to this operational amplifier OP2 through a resistor R10. The output terminal of another operational amplifier OP3 is connected to the (+) input terminal of the operational amplifier OP2 and resistors R11, R17 are connected to the output terminal of this operational amplifier OP2. The other end of the resistor R17 is grounded. A variable resistor R12 and a capacitor C6 are connected to the other end of the resistor R11. The other end of this variable resistor R12 is grounded, and the (−) input terminal of an operational amplifier OP4 is connected to the other end of the capacitor C6. Negative feedback is applied to the operational amplifier OP4 through the resistor R13.

The output terminal of the operational amplifier OP4 is connected to the other end of the capacitor C7. The output terminal of the operational amplifier OP3 is connected to the (+) input terminal of the operational amplifier OP4, and the output terminal of the operational amplifier OP4 is connected to the gain variable amplification circuit 205 via a terminal S5. The other end of the resistor R18 is grounded. The band pass filter (BPF) 204 consists of these resistors R8, R9, R10, R11, R12, R13, R17, R18, the capacitors C4, C5, C6, C7 and the operational amplifiers OP2, OP4. The BPF 204 is a two-stage filter.

On the other hand, the terminal S1 is connected to the (+) input terminal of the operational amplifier OP3 through the resistor R14, and a capacitor C14 and a variable resistor R15 are further connected thereto. The other end each of the capacitor C14 and the variable resistor R15 is grounded. The power source voltage is applied as a driving power source to the operational amplifier OP3 via the terminal S2. Negative feedback is applied to this amplifier OP3, and a parallel circuit of a resistor R16 and a capacitor 19 is connected to the output terminal. The other end of each of resistor R16 and capacitor C19 is grounded. The power terminal S2 of the operational amplifier OP3 is grounded via the capacitor C3.

The reference voltage generation circuit 203 consists of these resistors R15, R16 and capacitors C3, C14, C19 and the operational amplifier OP3. The output RV of the operational amplifier OP3 is fixed to the reference voltage by adjusting suitably the resistor R14 and the variable resistor R15. The reference voltage is 3.6 V, for example.

Figure 3:
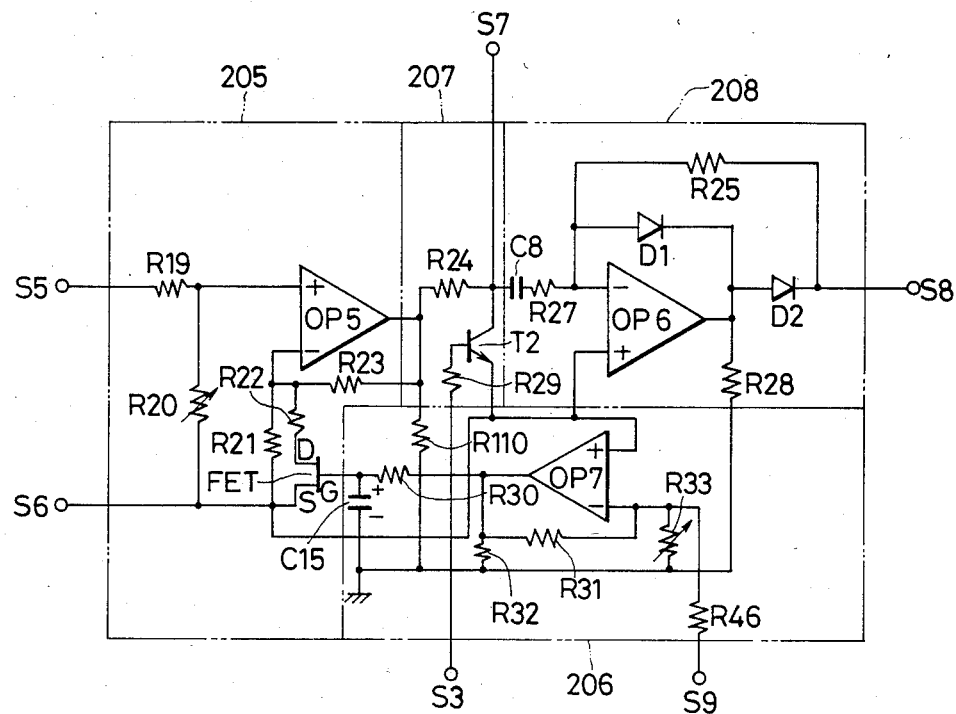

FIG. 3 shows in detail the gain variable amplification circuit 205, the gain control circuit 206, the mask circuit 207 and the half wave rectification circuit 208.

In the drawing, the terminal S5 shown in FIG. 2 is connected to the (+) terminal of an operational amplifier OP5 via a resistor R19. A variable resistor R20 is connected to the (+) terminal of the operational amplifier OP5 and the terminal S6 shown in FIG. 2 is connected to the other end of this variable resistor R20. Resistors R21, R22, R23 are connected to the (−) input terminal of the operational amplifier OP5. The drain of a FET is connected to the other end of this resistor R22. The source of the FET is connected to the terminal S6 shown in FIG. 2 while the gate is connected to a resistor R30 and a capacitor C15. The other end of the capacitor C15 is grounded and the other end of the resistor R30 is connected to the output terminal of another operational amplifier OP7. The other end of the resistor R21 is connected to the (+) input terminal of the operational amplifier OP7. The other end of the resistor R23 is connected to the output terminal of the operational amplifier OP5. Resistors R24, R110 are connected to the output terminal of the operational amplifier OP5. The other end of the resistor R24 is connected to a terminal S7 and to the collector of a transistor T2 while the other end of the capacitor C8 is connected to the (−) input terminal of the operational amplifier OP6 through a resistor R27. A resistor R25 and the anode of a diode D1 are connected to the (−) input terminal of this operational amplifier OP6, and the output terminal of the operational amplifier OP6 and the anode of another diode D2 are connected to the cathode of this diode D1. The other end of the resistor R25 described above and a terminal S8 are connected to the cathode of the diode D2.

The emitter of the transistor T2 and the (+) input terminal of an operational amplifier OP7 are connected to the (+) input terminal of the operational amplifier OP6. The terminal S3 is connected to the base of the transistor T2 via the resistor R29. A resistor R31 and a variable resistor R33 are connected to the (−) input terminal of the operational amplifier OP7 and an input terminal S9 is further connected to it via a resistor R46. The other end of this resistor R31 is connected to the output terminal of the operational amplifier OP7 and the other end of the variable resistor R33 is grounded. The output terminal of the operational amplifier OP7 is grounded via a resistor R32.

The gain variable amplification circuit 205 comprises the resistors R19, R20, R21, R22, R23, FET and the operational amplifier OP5. The gain control circuit 206 comprises the resistors R30, R31, R32, R33, R46, the capacitor C15 and the operational amplifier OP7.

The mask circuit 207 comprises the resistors R24, R29, R110 and the transistor T2.

The half wave rectification circuit 208 comprises the resistors R25, R27, R28, the capacitor C8, the diodes D1, D2, and the operational amplifier OP6.

Figure 4:
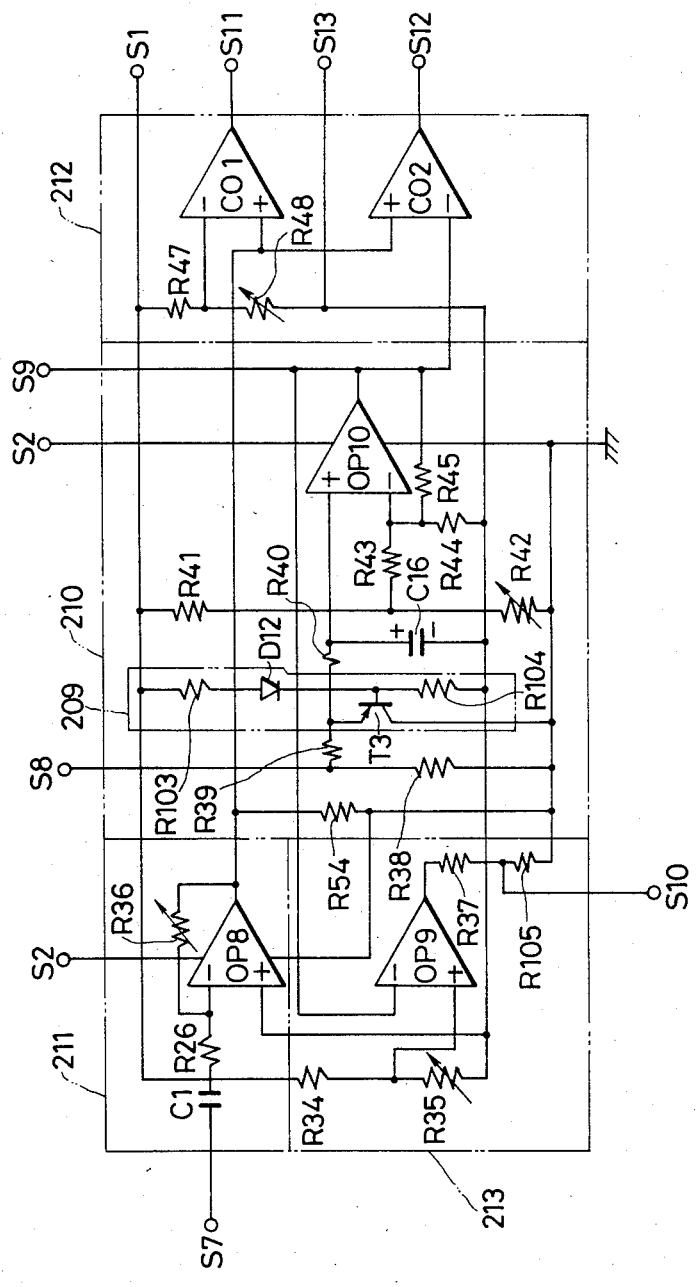

FIG. 4 shows in detail the knock signal clamp circuit 209, the background level (BGL) detection circuit 210, the signal amplification circuit 211, the comparator 212 and the fail-safe circuit 213.

In the diagram, the terminal S7 shown in FIG. 3 is connected to the resistor R26 via the capacitor C1. The other end of this resistor R26 is connected to the (−) input terminal of an operational amplifier OP8, and at the same time, is connected to the output terminal of the amplifier OP8 via a variable resistor R36.

The signal amplification circuit 211 comprises the capacitor C1, the resistor R26, the variable resistor R36 and the operational amplifier OP8.

The power source voltage is applied from the terminal S2 to the power terminal of the operational amplifier OP8 and its ground terminal is grounded. A variable resistor R35 and a terminal S13 is connected to the (+) input terminal of the operational amplifier OP8. The terminal S1 shown in FIG. 2 is connected to the other end of the variable resistor R35 via the resistor R34. The other end of this variable resistor R35 is connected to the (−) input terminal of another operational amplifier OP9. The (+) input terminal of the operational amplifier OP9 is connected to the terminal S9 and a resistor R37 is connected to its output terminal. A resistor R105 and a terminal S10 are connected to the other end of this resistor R37. The other end of the resistor R105 is grounded.

The fail-safe circuit 213 comprises these resistors R34, R35, R37, R105 and the operational amplifier OP9.

The output terminal of the operational amplifier OP8 is grounded via a resistor R54 and at the same time, is connected to the (+) input terminals of comparators CO1 and CO2. The other end of the resistor R54 is grounded. The anode of a diode D12 is connected to the terminal S1 via a resistor R103. The base of a transistor T3 and a resistor R104 are connected to the cathode of this diode D12. Resistors R39, R40 are connected to the emitter of the transistor T3 and its collector is grounded. A terminal S8 and a resistor R38 are connected to the other end of the resistor R39 and the other end of the resistor R38 is grounded.

The (+) input terminal of an operational amplifier OP10 and a capacitor C16 are connected to the other end of the resistor R40 described above and the other end of this capacitor C16 is connected to a terminal S13. Resistors R43, R44 and R45 are connected to the (−) input terminal of this operational amplifier OP10. A resistor R41 and a variable resistor R42 are connected to the other end of the resistor R43. The other end of this resistor R41 is connected to the terminal S1. The other end of the variable resistor R42 is grounded. The other end of the resistor R44 is connected to the terminal S13. The other end of the resistor R45 is connected to the output terminal of an operational amplifier OP10. A terminal S9 and the (+) input terminal of the operational amplifier OP9 are connected to the output terminal of this operational amplifier OP10. On the other hand, the other end of a resistor R104 is connected to the terminal S13.

The knock clamp circuit 209 comprises the resistors R103, R104, the diode D12 and the transistor T3 and the background level (BGL) detection circuit 210 comprises the resistors R54, R38, R39, R40, R41, R42, R43, R44, R45, the capacitor C16 and the operational amplifier OP10.

A resistor R47 and a variable resistor R48 are connected to the (−) input terminal of the comparator CO1 whose (+) input terminal is connected to the output terminal of the operational amplifier OP8. The other end of this resistor R47 is connected to the terminal S1 while that of the variable resistor R48 is connected to the terminal S13. The output terminal of the operational amplifier OP10, the (+) input terminal of the operational amplifier OP9 and the terminal S9 are connected to the (−) input terminal of the comparator CO2 whose (+) input terminal is connected to the output terminal of the operational amplifier OP8. The terminal S11 is connected to the output terminal of the comparator CO1 while the terminal S12 is connected to the output terminal of the comparator CO2.

The comparator 212 comprises the resistor R47, the variable resistor R48 and the comparators CO1, CO2.

Figure 5:
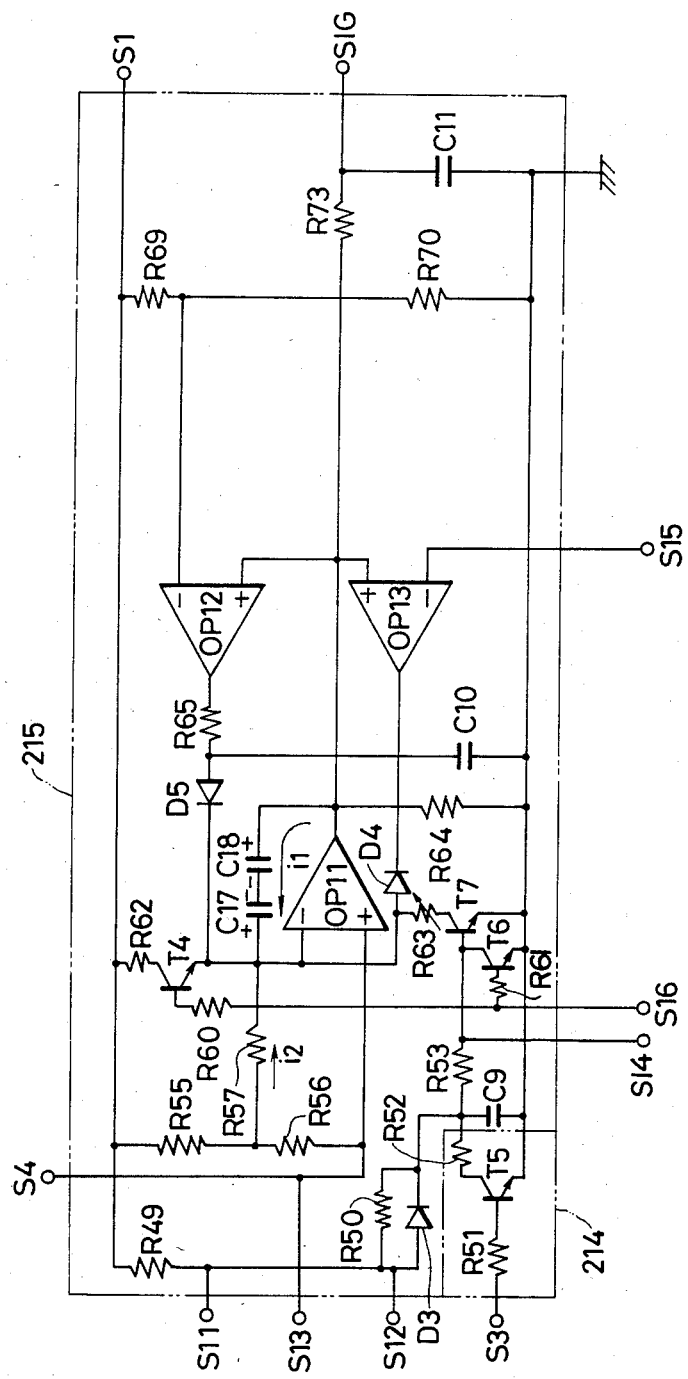

FIG. 5 shows in detail the mask circuit 214 and the knock signal voltage conversion circuit 215.

In the diagram, the base of a transistor T5 is connected to tht terminal S3 shown in FIG. 2 via a resistor R51, and its collector is connected to a resistor R52 with its emitter being grounded. The mask circuit 214 comprises these resistors R51, R52 and the transistor T5.

Resistors R49, R50 and the anode of a diode D3 are connected to the terminal S11 when in FIG. 4. Similarly, the resistors R49, R50 and the anode of the diode D3 are connected to the terminal S12 shown in FIG. 4. The other end of the resistor R49 is connected to the terminal S1 shown in FIG. 2 and that of the resistor R50, to the cathode of the diode D3. Resistors R52, R53 and a capacitor C9 are connected to the cathode of the diode D3. The other end of this capacitor C9 is grounded and the other end of the resistor R53 is connected to the collector of a transistor T6 and to the base of another transistor T7. A variable resistor R63 is connected to the collector of the transistor T7 while the emitter of the transisor is grounded. A resistor R61 is connected to the base of the transistor T6 while its emitter is grounded. A terminal S16 and a resistor R60 are connected to the other end of this resistor R61. The other end of this resistor R60 is connected to the base of the transistor T4. The collector of this transistor T4 is connected to the terminal S1 shown in FIG. 2 via a resistor R62. The cathode of a diode D5 and the (−) input terminal of an operational amplifier OP11 are connected to the emitter of the transistor T4. A capacitor C17, a resistor R57 and the anode of the diode D4 are connected to the (−) input terminal of this operational amplifier OP11. Resistors R55, R56 are connected to the other end of this resistor R57. The other end of the resistor R55 is connected to the terminal S1 shown in FIG. 2. The other end of the resistor R56 is connected to the terminal S13 shown in FIG. 4 and to the (+) input terminal of the operational amplifier OP11.

The output terminal of the operational amplifier OP11 is connected to the other end of the capacitor C17 via a capacitor C18. A resistor R64, the (+) input terminal of an operational amplifier OP12, the (+) input terminal of an operational amplifier OP13 and a resistor R73 are connected to the output terminal of the operational amplifier OP11. The terminal S1 shown in FIG. 2 is connected to the (−) input terminal of the operational amplifier OP12 via a resistor R69. The anode of a diode D5 and a capacitor C10 are connected to the output terminal of this operational amplifier OP12 via a resistor R65. The other end of this capacitor C10 is grounded.

The (−) input terminal of the operational amplifier OP12 is grounded via a resistor R70.

On the other hand, a terminal S15 is connected to the (−) input terminal of an operational amplifier OP13, whose output terminal is connected to the cathode of the diode D4. A capacitor C11 and a signal terminal SIG are connected to a resistor R73 and the other end of this capacitor C11 is grounded.

The knock signal voltage conversion circuit 215 comprises the resistors R49, R50, R53, R55, R56, R57, R60, R61, R62, R63, R64, R65, R69, R70, R73, capacitors C9, C10, C11, C17, C18, diodes D3, D4, D5, transistors T4, T6, T7, and the operational amplifiers OP11, OP12, OP13.

Figure 6:
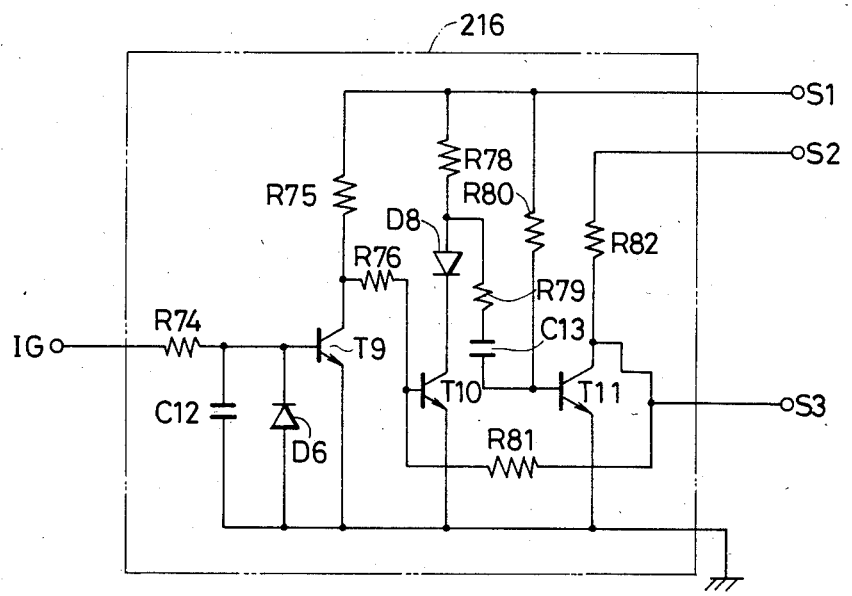

FIG. 6 shows in detail the mono-stable circuit (OSM) 216.

In the drawing, a resistor R74 is connected to the input terminal IG for the ignition signal, that is, the signal from the power transistor 503 (see FIG. 1). A capacitor C12, the cathode of a diode D6 and the base of a transistor T9 are connected to the other end of this resistor R74. The other end of the capacitor C12, the anode of the diode D6 and the exitter of the transistor T9 are grounded. Resistors R75, R76 are connected to the collector of the transistor T9. The other end of the resistor R75 is connected to the terminal S1 shown in FIG. 2 and the other end of the resistor R76, to the base of a transistor T10. The emitter of the transistor T10 is grounded with its collector being connected to the cathode of a diode D8. Resistors R78, R79 are connected to the anode of this diode D8. The other end of the resistor R78 is connected to the terminal S1 shown in FIG. 2 and the other end of the resistor R79 is connected to the base of a transistor T11 via a capacitor C13. The terminal S1 shown in FIG. 2 is further connected to the base of this transistor via a resistor R80 and the emitter of this transistor R11 is grounded. The collector of the transistor T11 is connected to the base of the transistor T10 via a resistor R81 and at the same time, to a resistor R82 and to the terminal S3 shown in FIG. 2. The other end of this resistor R82 is connected to the terminal S2 shown in FIG. 2.

The mono-stable circuit 216 comprises the R74, R75, R76, R78, R79, R80, R81, R82, capacitors C12, C13, diodes D6, D8 and transistors T9, T10, T11.

Figure 7:
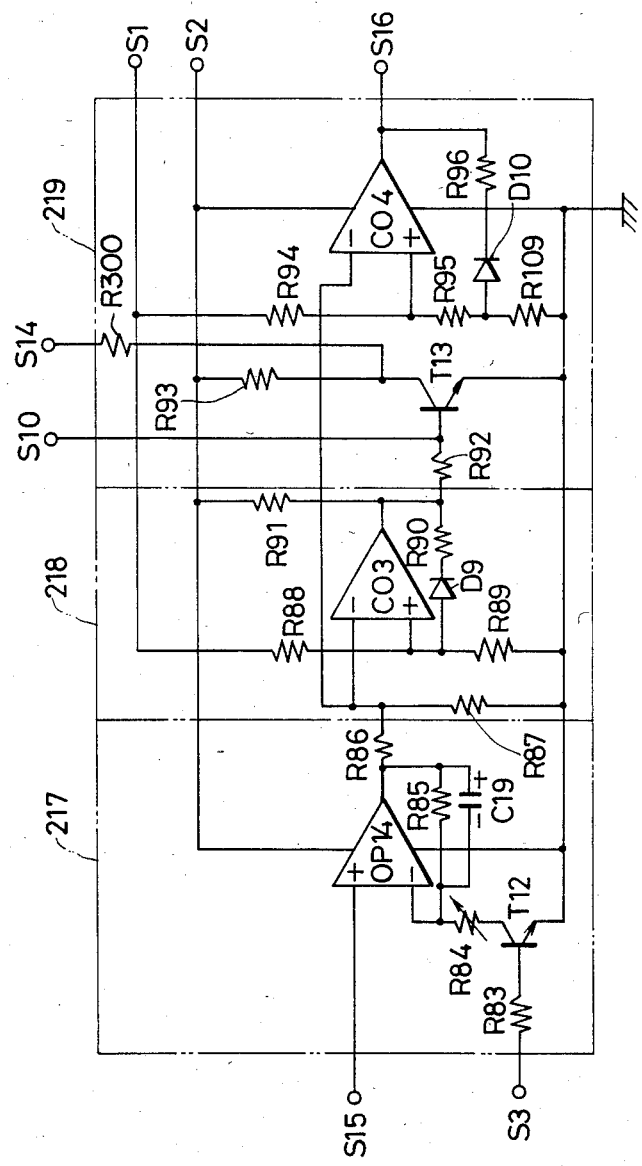

FIG. 7 shows in detail the frequency-voltage (F-V) generator 217, the first number-of-revolutions detection circuit 218 (2,400 rpm) and the second number-of-revolutions detection circuit 219 (350 rpm).

In the drawing, the terminal S15 shown in FIG. 5 is connected to the (+) input terminal of an operational amplifier OP14. A variable resistor R84 is connected to the (−) input terminal of this operational amplifier OP14. The collector of a transistor T12 is connected to the other end of the variable resistor R84. The emitter of the transistor T12 is grounded and its base is connected to the terminal S3 shown in FIG. 2 via a resistor R83.

The output terminal of this operational amplifier OP14 is fed back to its negative (−) input terminal via a parallel circuit of a resistor R85 and a capacitor C19 and at the same time, is connected to a resistor R87 and the (−) input terminal of the comparator CO3 and to the (−) input terminal of the comparator CO4 through a resistor R86. The other end of the resistor R87 is grounded. The power source voltage is applied from the terminal S2 shown in FIG. 2 to the power terminal of this operational amplifier OP14 and the ground terminal of the amplifier is grounded. Resistors R88, R89 and the anode of a diode D9 are connected to the (+) input terminal of the comparator CO3 and the other end of the resistor R89 is grounded. The other end of the resistor R88 is connected to the terminal S1 shown in FIG. 2 and the cathode of the diode D9 is connected to the output terminal of the comparator CO3 through a resistor R90. Resistors R91, R92 are connected to the output terminal of this comparator CO3. The other end of the resistor R91 is connected to the terminal S2 shown in FIG. 2 and the other end of the resistor R92 is connected to the terminal S10 shown in FIG. 4 and to the base of the transistor T13. The emitter of this transistor T13 is grounded and its collector is connected to the terminal S14 shown in FIG. 5 and to a resistor R93. The other end of this resistor R93 is connected to the terminal S2 shown in FIG. 2.

On the other hand, resistor R94 and R95 are connected to the (+) input terminal of the comparator CO4 and the other end of this resistor R94 is connected to the terminal S1 shown in FIG. 2 with the other end of the resistor R95 being connected to a resistor, R109 and to the anode of the diode D10. The other end of the resistor R109 is grounded. The cathode of the diode D10 is connected to the output terminal of the comparator CO4 through the resistor R96. The power is applied from the terminal S2 shown in FIG. 2 to the power terminal of this comparator CO4, and its ground terminal is grounded. The terminal S16 shown in FIG. 5 is connected to the output terminal of the comparator CO4.

The F-V generator 217 comprises these resistors R83, R84, R86, variable resistor R85, transistor T12, capacitor C19 and operational amplifier OP14.

The first number-of-revolutions detection circuit 218 comprises the resistors R87, R88, R89, R90, R91, diode D9 and comparator CO3.

The second number-of-revolutions detection circuit 219 comprises the resistors R92, R93, R94, R95, R96, R109, transistor T13, diode D10 and comparator CO4.

Figure 8:
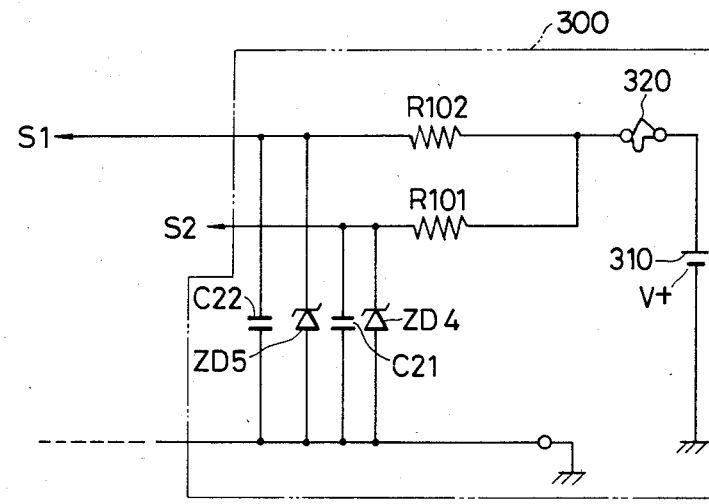

FIG. 8 shows in detail the power source voltage circuit 300. The positive terminal of the battery 310 (V+) as the power source is connected to the terminal S1 through a switch 320 and a resistor R102 and to the terminal S2 through a resistor R101, while its negative terminal is grounded. A parallel circuit of a zener diode ZD5 and a capacitor C22 is interposed between the terminal S1 and the ground so as to limit the output voltage and a parallel circuit of a zener diode ZD4 and a capacitor C21 is interposed between the terminal S2 and the ground.

Next, the operation of the knock control apparatus 200 will be explained.

Figure 9:
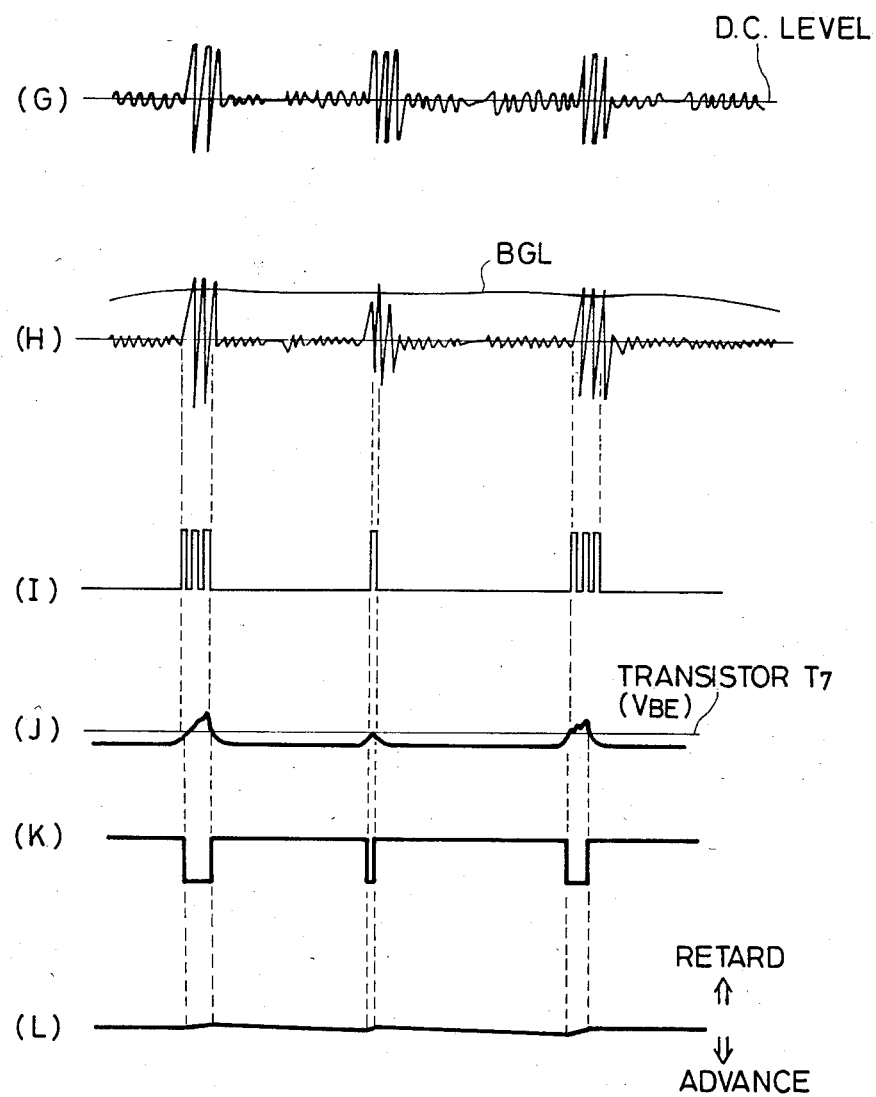
FIG. 9 A-L are waveform charts showing the operation waveforms of the circuits shown in FIGS. 2 through 8.

When a signal such as shown in FIG. 9(A) is applied to the IG terminal of the mono-stable circuit (OSM) shown in FIG. 6, the transistor T9 is turned on with the transistor T10 being tuned off under the "HIGH" state of this signal. When the transistor T10 is turned off, the route from the terminal S1→resistor R78→resistor R79→capacitor C13→base of transistor T11 is formed. When the base signal to the IG terminal is in the "LOW" state, on the other hand, the transistor T9 is turned off with the transistor T10 being turned on. Hence, the route extending from the terminal S1→resistor R80→capacitor C13→resistor R79→diode D8→transistor T10→ground is formed. These two routes are a charge-cischarge circuit of the capacitor C13 and the collector of the transistor T11 forms a pulse in synchronism with the spark timing having a timing width $T_1$ such as shown in FIG. 9(B).

This signal is applied to the base of the transistor T1 of the ignition noise cut circuit 202 shown in FIG. 2 through the terminal S3 and becomes the ignition noise cut signal, which is then applied to the base of the transistor T2 of the mask circuit 207 shown in FIG. 3 and further to the base of the transistor T5 of the mask circuit 214 shown in FIG. 5, thereby playing the role of cutting the ignition noise.

FIG. 9(A) shows the ignition timing waveform. In practice, this waveform signal becomes the base signal of the power transistor 503 of the later-appearing non-contact ignition device 500. When the base signal is at the "HIGH" level, the transistor 503 is turned on and when it is at the "LOW" level, the transistor 503 is turned off. The spark of the ignition coil is generated during the process in which the power transistor 503 is changed over from ON to OFF.

If the input impedance of the knock control apparatus 200 is raised, disturbance noise is likely to be superposed. Typical of disturbance noise is a high frequency noise, that is, the ignition noise (Ig noise), that is generated in synchronism with the ignition timing.

This ignition noise will be next explained. The base control signal of the power transistor 503 is a pulse such as shown in FIG. 9(A). When this pulse is at the "HIGH" level, the power transistor 503 is turned on and when it is at the "LOW" level, the transistor is turned off. The secondary voltage of the ignition coil drastically rises during the changing of the transistor from an ON to an OFF state or at the time when the transistor is turned off, thereby generating the primary noise. As the secondary voltage rises further, the insulation of the air layer between the plugs is broken, causing ignition. The secondary noise occurs at this time of ignition. The secondary noise can be classified into the noise due to the capacitance discharge current flowing at the initial stage of ignition and noise due to the induction discharge current at the later stage. Among the secondary noise, the former becomes the major noise source. If the input impedance is elevated, the primary and secondary noise (the former noise) is superimposed with the knock sensor output as the disturbance noise that exerts adverse influences upon the knock signal distinction.

Such a disturbance noise lasts for 50 to 60μ sec and must be eliminated. Accordingly, the output of the knock sensor 100 may as well be masked during this period. To accomplish this object, the ignition noise cut circuit 202 and the mask circuits 207 and 214 are disposed. However, the practical mask period is set to a time width sufficiently greater than the noise duration period described above, such as about 0.8 msec, for example.

It will be assumed that the signal such as shown in FIG. 9(C) is produced from the knock sensor 100. In this case, the amplitude of the signal is reduced by resistance division by the resistors R1 and R2 of the amplifier 201, shown in FIG. 2, as depicted in FIG. 9(D), and the signal is then applied to the ignition noise cut circuit 202. The signal detected by the knock sensor 100 is a signal that fluctuates to the positive and negative with the d.c. zero (0) level being the reference. This ignition noise cut circuit 202 cuts the ignition noise primarily due to the operation of the transistor T1. This transistor T1 is subjected to the ON/OFF control by the output of the mono-stable circuit (OSM) 216 from the terminal S3.

The transistor T1 is turned on only in the $t_1$ period in which the output of this mono-stable circuit 216 is at the "HIGH" level. Accordingly, the output of the knock sensor 100 is short-circuited to the ground in this $t_1$ period, no input is applied to the operational amplifier OP1 and the ignition noise (Ig noise) is masked.

A signal such as shown in FIG. 9(E) is produced at the output terminal of this ignition noise cut circuit 202. The signal shown in FIG. 9(E) is amplified by the operational amplifier OP1 and moreover, since feedback from the reference voltage generation circuit 203 is applied, a signal such as shown in FIG. 9(F) is produced from the output terminal of the operational amplifier OP1 as an a.c. signal having a d.c. level (3.6 V) as its reference.

The gain (G) of amplification of this operational amplifier OP1 is as follows:

$$G = R_4/(R_1 + R_3)$$

The signal such as shown in FIG. 9(F) is applied to the band pass filter (BPF) 204 shown in FIG. 2. This band pass filter 204 produces the signal by stressing only the knock signal (or damping the other signals), has a peak value close to the knocking frequency and attenuates a little at a frequency higher than the knock signal.

The gain variable amplification circuit 205 shown in FIG. 3 receives the feedback signal from the background level detection circuit 210 shown in FIG. 4 through the half wave rectification circuit, and changes the gain of its own in inverse proportion to the feedback signal, that is, the background level (BGL) output. In the mask circuit 207 shown in FIG. 3, mask is applied to the output of the gain variable amplification circuit 207 at a predetermined timing of the signal of the terminal S3. The mask signal at the terminal S3 is the pulse signal shown in FIG. 9(B). Upon receiving the output of this mask circuit 205, the background level detection circuit 210 shown in FIG. 4 detects the background level of the knock signal. The comparator 212 compares the background level output (voltage) of the background level detection circuit 210 with the output of the signal amplification circuit 211. A signal such as shown in FIG. 9(G) is produced at the output terminal of the operational amplifier OP4 of the band pass filter 204 shown in FIG. 2. The ignition signal is again superimposed with the ignition noise. The signal such as shown in FIG. 9(G) is applied to the gain variable amplification circuit 205 shown in FIG. 3.

Referring back to FIG. 2, the output of the band pass filter 204 produced at the terminals S5 and S6 is applied to the gain variable amplification circuit 205 shown in FIG. 3. The output of the gain amplification circuit 205 is divided into two systems via the mask circuit 207. The first system consists of the amplifier 211 that amplifies the knock signal via the terminal S7 and the comparison circuit 212 that receives the output of the former to one of its input terminals. The second system consists of the half wave rectification circuit 208 shown in FIG. 3, the knock signal clamp circuit 209 shown in FIG. 4 and the background level detection circuit 212 consisting of an integration circuit and an amplification circuit. The output of the background level detection circuit is applied to the other input terminal of the comparison circuit 212. The output of the background level detection circuit 210 is also applied to the gain control circuit 206 via the terminal S9 and is fed back to the gain variable amplification circuit 205.

The output of the knock sensor 100 changes within the range of ±5 (mV)~600 (mV). In other words, the sensor output changes within the range of 120 times. If this output is simply amplified (e.g., 100 times), the output voltage changes within the range of ±0.5 (V)~±60 (V). In a car, however, the maximum battery voltage is about 12 (V) and can not take the value 60 (V). Accordingly, the conventional methods are either that small gain is used in order to prevent saturation or a gain that effects processing at the sacrifice of the gain. The former method involves the problem that sensitivity drops to a small input whereas the latter involves the problem that sensitivity drops with to a large amplification input. In the construction in accordance with this embodiment, the gain variable amplification circuit 205 is disposed on the output side of the band pass filter 204 and the output of the gain control circuit 206 is furnished with an integration time constant. According to this construction, the level difference becomes great between the knock signal of the band pass filter 204 and the non-knock signal and the signal is applied with the level difference thus enlarged, so that even if drastic change occurs in the background level, the signal and the background level can change at the same speed and an output having a high S/N can be obtained.

In consequence, the output that is filtrated by the band pass filter 204 is applied to the (+) input terminal of the operational amplifier OP5 through the resistor R19 of the gain variable amplification circuit 205 shown in FIG. 3. A FET whose gain is controlled via the gain control circuit 206 is disposed at the input terminal of the (−) input terminal of the operational amplifier OP5. Accordingly, the gain of the gain variable amplification circuit 205 is changed in accordance with the output of the operational amplifier OP10 of the background level detection circuit 210 shown in FIG. 4. The output of the gain variable amplification circuit 205 is masked by the mask circuit 207 at the predetermined timing and is applied to the (−) input terminal of the operational amplifier OP6 of the half wave rectification circuit 208 via the capacitor C8 and the resistor R27.

The gain G (Z) of the gain variable amplification circuit 205 (FIG. 3) is as follows:

The output resistance of the FET in the unsaturation range is given by:

$$r = 1 / \left\{ 1 - \left( \frac{V_{DS} - V_{GS}}{-V_P} \right)^{\frac{1}{2}} \right\} / Y_O \quad (1)$$

where:
$V_{DS}$: drain-source voltage
$V_{GS}$: gate-source voltage
$V_p$: pinch-off voltage
$Y_O$: admittance Accordingly, the gain G (Z) of the gain variable amplification circuit 205 is given by:

$$G(Z) = 1 + \quad (2)$$

-continued $$\frac{R23}{R21}\left(1 + \frac{R21}{R22 + \dfrac{1}{Y_O\left\{1 - \left(\dfrac{V_{DS} - V_{GS}}{-V_P}\right)^{\frac{1}{2}}\right\}}}\right)$$

Incidentally, since the linearity of the output resistance of the FET decreases with a decreasin $V_{DS}$, the gain of the band pass filter 204 is set so that the background noise signal of the output of the band pass filter 204 becomes several millivolts. For this reason, the $V_{DS}$ value in equation (2) is sufficiently smaller than $V_{GS}$ and in the following calculation, the $V_{DS}$ value in equation (2) is handled as being 0 (V).

The ignition noise is superimposed with the waveform produced from this gain variable amplification circuit 205 as described earlier; hence, masking is made by the mask circuit 207. In other words, the transistor T2 of this mask circuit 207 becomes conductive by the output signal from the mono-stable circuit (OSM) shown in FIG. 6 which is applied to its base. When this transistor T2 becomes conductive, the output of the gain variable amplification circuit 205 drops to the ground potential and is masked.

This masked signal is applied to the half wave rectification circuit 208 and to the signal amplification circuit 211 shown in FIG. 4.

In the half wave rectification circuit 208, half wave rectification is effected for only the negative direction component by the operation of the diodes D1, D2 and the rectified signal is applied to the knock signal clamp circuit 209 shown in FIG. 4 through the terminal S8 and the resistor R39. The signal is integrated by an integration circuit consisting of the resistor R40 and capacitor C16 of the background level detection circuit 210 through this clamp circuit 209. After the signal thus integrated is smoothed and is further amplified by the operational amplifier OP10, the output is applied to the comparator 212. On the other hand, the signal amplification circuit 211 effects amplification on the basis of the amplification ratio of the operational amplifier OP8.

The gain $G_1$ of the half wave rectification circuit 208 shown in FIG. 3 is given by:

$$G_1 = \frac{R25 R26}{R24 R26 + R27(R24 + R26)} \tag{3}$$

In the background level detection circuit 210 shown in FIG. 4, the gain $G_3$ of the amplifier consisting of the resistors R44, R45 and the operational amplifier OP10 is given by:

$$G_3 = 1 + \frac{R45}{R44} \tag{4}$$

The gain $G_2$ of the integrator consisting of the resistor R40 and capacitor C16 of the background level detection circuit 210 when the half wave rectification signal is applied is given by the following equation with E representing the half wave peak voltage:

$$R40\frac{dq}{dt} + \frac{q}{c} = A \tag{5}$$

where $t_0 \leq t \leq t_1$, $A = E\sin(\omega t)$ $t_1 \leq t \leq t_2$, $A = 0$ After all, the terminal voltage $v_c(t)$ of the capacitor C16 is given by:

$$v_{c1}(t) = \frac{E}{1 + (\omega C16 R40)^2} \{\sin(\omega t) - \omega C16 R40 \sin(\omega t)\} + \tag{6}$$

$$\left\{v_c(t_0) + \frac{\omega C16 R40}{1 + (\omega C16 R40)^2} E\right\} e^{-\frac{t}{C16 R40}}$$

where: $t_0 \leq t \leq t_1$ $$v_{c2}(t) + V_{c1}(t_2)e^{-\frac{1}{C16 R40}(t - t_1)} \tag{7}$$

Under the steady state, $v_{c1}(t_0) = v_{c2}(t_2)$; hence, $$v_{c1}(t_0) = \frac{\omega C16 R40}{1 + (\omega C16 R40)^2} \cdot \frac{1}{e^{\frac{\pi}{\omega C16 R40}} - 1} \cdot E \tag{8}$$

When putting the time constant C16R40 (=at least 50 msec) and the frequency f (=at least 5 KHz) into this equation (8), $$v_{c1}(t_0) = E \cdot G_2 \simeq E/\pi \tag{9}$$

From equation (2), (3), (4) and (9) described above, the difference of the the BGL voltage $\Delta V_{BGL}$ is given by the following equation (10):

$$\Delta V_{BGL} = G1 \cdot G2 \cdot G3\ G(Z) \cdot v_{in} \tag{10}$$

where $\Delta V_{BGL}$ is the difference of the background level with respect to $V_{ref}$ (output voltage from reference voltage regeneration circuit 203, e.g. 3.6 V), $V_c$ is the output voltage of the gain control circuit and $v_{in}$ is the output voltage of BPF 204.

On the other hand, the gate-source voltage ($V_{GS}$) of FET is given by:

$$V_{GS} = V_c - V_{ref} \tag{11}$$

$$= \frac{R31}{R33} V_{ref} - \frac{R31}{R46} \Delta V_{BGL}$$

Thus, $V_{in}$ can be obtained by the following equation by eliminating $V_{GS}$ from equation (10) and (11):

$$V_{in} = \frac{\Delta V_{BGL}}{G1 \cdot G2 \cdot G3 \left[1 + \frac{R23}{R21}\left(1 + \frac{R21}{R22 + \left(\frac{1}{Y01 - \left(\frac{R46 \cdot R31 \cdot V_{ref} - R31 \cdot R33 \, \Delta V_{BGL}}{R46 \cdot R33 \cdot V_p}\right)^{\frac{1}{2}}}\right)}\right)\right]} \quad (12)$$

Figure 10:
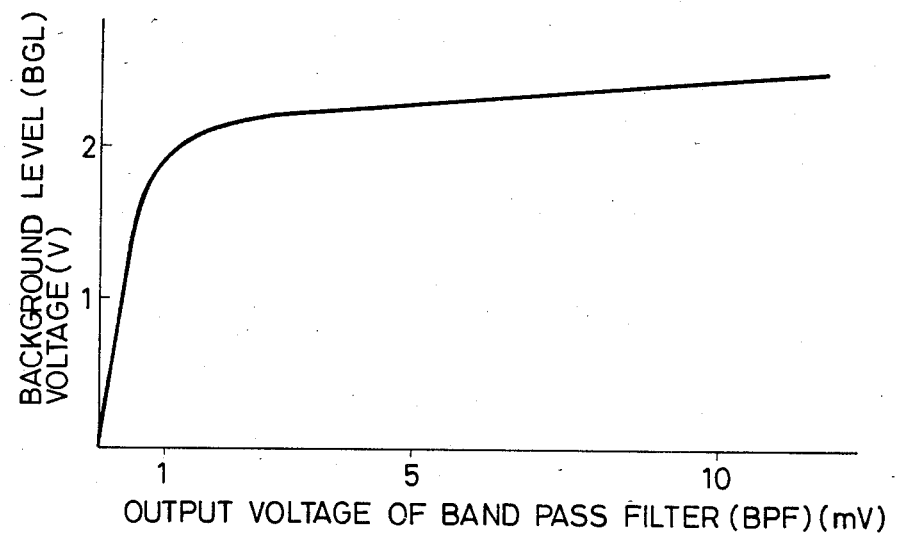
FIG. 10 is a diagram showing the gain characteristics of a gain variable amplification circuit 205 shown in FIG. 3.

The characteristics such as shown in FIG. 10 can be obtained by putting the values $V_p$=approx. 2 V, $R_o$=85Ω and $Y_o$=approx. 12 (mΩ) for FET.

The background level and the signal thus obtained are compared with each other by the comparator 212 as shown in FIG. 9(H).

The gain variable amplification circuit 205 shown in FIG. 3 is controlled by the output from the output terminal of the output operational amplifier OP7 of the gain control circuit 206. If the output of this operational amplifier OP7 is great, the gate voltage of FET becomes high. Since the unsaturation resistance (source-drain resistance, approximately 200Ω) of FET is small, the gain of the operational amplifier OP5 becomes then extremely great (about 30 times). On the other hand, if the output of the operational amplifier OP7 is small, the gate volatage of FET drops, so that the unsaturation resistance of drain-source becomes extremely great (e.g. 20 KΩ) and the gain of the operational amplifier OP5 becomes extremely small (e.g. about 3 times).

In the gain control circuit 206, the background voltage at the division point between R46 and R33 is higher than 3.6 V, for example, the gain of the operational amplifier OP5 is reduced because the background voltage is high. If it is low, on the contrary, the gain of the operational amplifier OP5 is raised because the predetermined value is not reached.

The integration circuit consisting of the resistor R30 and the capacitor C15 is disposed on the output side of the gain control circuit 206. This integratism circuit has a time constant of about 0.5 seconds which is greater than the time constant (about 0.2 seconds or below) of the integration circuit consisting of the resistor R40 and capacitor 16 of the background level detection circuit 210. For this reason, the gain remains substantially constant for a period of about 0.5 seconds.

Oscillation of the engine always changes even if its speed is constant and the load condition is also constant. This oscillation is always accompanied by small ripples. Unless the integration circuit consisting of the resistor R30 and the capacitor C15 is used, the gain of the gain variable amplification circuit 205 will change rapidly for the ripple signals of the oscillation. On the other hand, the comparator 212 shown in FIG. 4 compares the background level with the knock sensor output signal. Though the sensor output signal follows and changes with the rapid change of the gain, response delay corresponding to the time constant (about 0.2 seconds) occurs in the background level because it has the time constant of the integration circuit consisting of the resistor R40 and the capacitor 16. In such a case, comparison will be made between the sensor output signal and the preceding background level, although it should be made between the sensor output signal and the background level at the time of knock.

A square wave such as shown in FIG. 9(I) is produced from this comparator 212. This pulse signal is applied to the knock signal voltage conversion circuit 215 through the mask circuit 214 shown in FIG. 5.

In the mask circuit 214, the transistor T5 is turned on by the output signal from the mono-stable circuit 216 shown in FIG. 6 and the output of the comparator 212 at this time flows to the ground through this transistor T5 and is masked. When the transistor T5 is turned off, the output signal from the comparator 212 is stored in the capacitor C9 and drives the transistor T7 through the resistor R53. The transistor T7 is also driven by the output signal from the second detection circuit 219 that detects the arrival of the number of revolution of the engine at 350 rpm. In other words, the power source voltage applied from the terminal S16 to the base of the transistor T6, that is interposed between the base and emitter of the transistor T7, is the output voltage from the lowest voltage detection circuit 220. At the start of the engine operation, the battery voltage drops below the predetermined lowest allowable voltage. This also holds true of the time when the battery capacity becomes small. The voltage applied to the base of the transistor T6 at the time of such an abnormal voltage drop becomes a high voltage, and is a low voltage at the time of the normal voltage. The transistor T6 is turned on at the time of the high voltage and the transistor T7 keeps the OFF state irrespective of the signal applied through the resistor R53. On the other hand, the transistor T6 is turned off when the voltage applied to its base is low, so that the transistor T7 is turned on and off in accordance with the voltage value applied thereto through the resistor R53.

In the knock signal voltage conversion circuit 215, the resistors R55, R56, R57, R60, R62 and the transistor T4 form a fixed advance angle setting circuit and its advance angle output signal is determined by the power source voltage supplied from the terminal S16 for the angle advance at the time of start.

An integrator is composed of the operational amplifier OP11, the capacitors C17, C18 and the resistor R64 while a maximum voltage clamp circuit is composed of the operational amplifier OP12, the resistors R65, R69, R70, R73 and the diode D5. Furthermore, a minimum voltage clamp circuit is composed of the operational amplifier OP13 and the diode D4. An integration circuit consists of the integrator, maximum voltage clamp circuit and minimum voltage clamp circuit.

The transistor T7 is turned on in synchronism with the knock signal which is hereby assumed to be the knock signal as the output from the comparator 212 shown in FIG. 4. Accordingly, as shown in FIG. 9(I), the transistor T7 becomes conductive for the period of the pulse width $t_o$ of the knock signal (which is from about 40 to about 70 μsec), and the current $i_1$ flows from the operational amplifier OP11 to the ground through the capacitors C18, C17, the resistor R63 and the transistor T7.

The voltage rise ratio $\Delta V_1$ per pulse (voltage rise/pulse) of the operational amplifier OP11 at this time is given by:

$$i_1 = 3.6/R63 \quad (13)$$

Hence, $$\Delta V_1 = \frac{i_1}{C} t_o \quad (14)$$

where the capacitance C represents the series capacitance of the capacitors C17 and C18. As can be seen clearly from this equation (14), the output voltage of the operational amplifier OP11 rises in proportion to the number of the knocking pulses. The zener voltage of the zener diode ZD4 of the power source circuit 300 shown in FIG. 8 is 6 (V). The (+) input terminal of the operational amplifier OP11 is 5.8 V.

The current $i_2$ can be expressed as follows:

$$i_2 = \frac{1}{\frac{R55 \cdot R56}{R55 + R56} + R57} \times \left( \frac{R56 \times (ZD4 - 3.6)}{R55 + R56} - 3.6 \right) \quad (15)$$

Hence, the output voltage of the operational amplifier OP11 drops in accordance with the following voltage drop ratio (voltage drop value/period) $\Delta V_2$:

$$\Delta V_2 = \frac{i_2}{C} (V) \quad (16)$$

The maximum value of the output of the integrator is clamped by the clamp voltage of the maximum clamp circuit while its minimum value is clamped by the clamp voltage of the minimum clamp circuit.

The integration circuit is furnished with specific advance angle characteristics (advance angle value) at the start of the engine as the transistor T4 is turned on by the output voltage of the low voltage detection circuit 220. The advance angle characteristics are such that the integration circuit of the knock signal. voltage conversion circuit 215 gives instruction and the retard circuit 502 makes practical advance angle (retard angle) control. A circuit, such as disclosed in U.S. patent application Ser. No. 80,202, by Noburu Sugiura, filed Oct. 1, 1979 and assigned to the assignee of this application, can be used as the retard circuit 502.

Next, the operation of the retard circuit 502 will be described.

The ignition timing characteristics are generally relative and are determined by a certain operation mode which is determined by the distributor and the ignition device used. The maximum retard angle characteristics at the time of knock are given in advance to the ignition timing characteristics so that the latter follows up the former at the time of knock.

Figure 11:
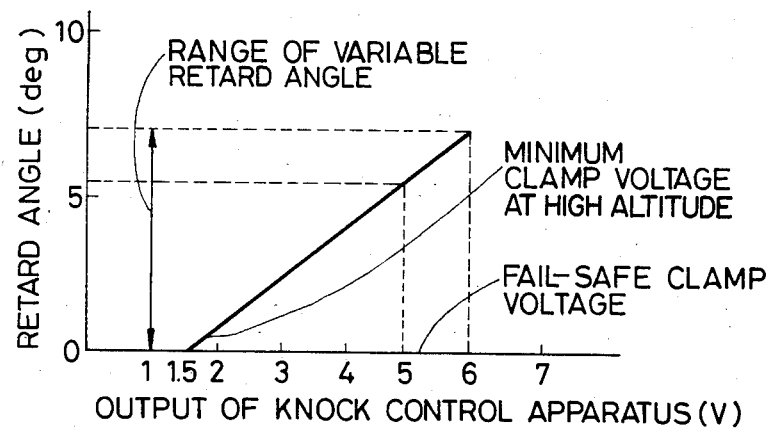
FIG. 11 is a diagram showing the characteristics of the retard circuit shown in FIG. 1.

The characteristics of the retard circuit are shown in FIG. 11. As shown in the diagram, the circuit has retard characteristic so that predetermined angle gradient characteristics are attained with respect to the output of the integration circuit of the knock signal voltage conversion circuit 215, that is, the output voltage of the integrator. For this reason, the advance angle has a predetermined angle for each period. In other words, the ignition timing advances a predetermined angle in each period while retarding the angle in accordance with the number of knocking pulses.

Next, the operation of the integration circuit for controlling the retard circuit 502, particularly the countermeasures for the advance angle at the start, will be described. When the number of revolutions of the engine is small, that is, at the time of the engine start, the signal at the terminal S16 becomes "HIGH" as will be described later and this signal turns on the transistors T6, T4 of the knock signal voltage conversion circuit 215 shown in FIG. 5. At this time, the transistor T7 is turned off. As the transistor T4 is turned on, a current flows through the power source through the resistor R62 in the same direction as the current $i_2$, and the output of the operational amplifier OP11 drops to the same voltage as the impressed voltage to the terminal S15 and is clamped. This voltage correspondsto the start clamp voltage 3.0 (V) shown in FIG. 13. The clamped output sets the ignition timing at the start. Thus, the retard circuit 502 is controlled and set to the maximum retard angle position during the starting period.

Next, the F-V generator 217 will be described. The transistor T12 is turned on when the two conditions, that is, the output signal from the mono-stable circuit 216 is "HIGH" and the transistor T9 is turned off, are satisfied. As a result, it is turned on with the pulse width $t_1$ shown in FIG. 9(B). Since the pulse period is proportional to the number of revolutions of the engine, the transistor T12 is driven after all in accordance with the number of revolution.

A voltage (about 1.7 V) is applied to the positive terminal of the operational amplifier OP14. When the transistor T12 is turned on, a route ranging from the output of the operational amplifier OP14 to the capacitor C19→R84→T12→ground is formed and hence, the capacitor C19 is charged. When the transistor is turned off, the charge of the capacitor C19 flows and discharges through to the resistor R85. The operational amplifier OP14 generates an output corresponding to the difference of the voltages to be applied to the positive and negative terminals and this output is applied to the negative terminal of the comparator CO3. A predetermined voltage (6.0 V) divided by the resistors R88, R89 is applied to the positive terminal of the comparator CO3. A voltage which is at least 1.7 V and is proportional to the number of revolutions is applied to the negative terminal of the comparator CO3 and is compared with the predetermined voltage (6 V)

When the voltage is at least 6 V, the output of the comparator CO3 becomes "LOW" and when it is below 6 V, the output becomes "HIGH". The voltage 6 V as the reference is one that corresponds, to the voltage at the high speed revolutions of the engine. More definitely, the number of revolutions corresponding to this voltage 6 V is set to 2,400 rpm. Accordingly, the output of the comparator CO3 becomes "HIGH" only when the number of revolutions is below 2,400 rpm. The HIGH voltage is applied to the transistor T13 through the resistor R92 and turns it on. The diode D9 and the resistor R90 are provided in order to provide hysterisis characteristics for preventing hunting of output voltage of the comparator CO3 when the engine speed oscillates near at 2,400 rpm.

The output of the operational amplifier OP14 is applied to the (−) terminal of the comparator CO4. A predetermined voltage (2.3 V), which is divided by series resistors R94, R95 and R109, is applied to the (+) terminal of this comparator CO4. A voltage which is at least 1.7 V and is proportional to the number of revolutions of the engine is applied to the (−) terminal of the comparator CO4 and is compared with the predetermined voltage 2.4 V described above. When the voltage is 2.4 V or above, the output of the comparator CO4 becomes "LOW" and when it is below 2.4 V, the comparator output becomes "HIGH". The 2.4 V voltage as the reference is one that corresponds to low speed revolution of the engine (during starting period). More definitely, the number of revolutions corresponding to this 2.4 V voltage is set to 350 rpm. Accordingly, the output of the comparator CO4 becomes "HIGH" only when the number of revolutions is below 350 rpm. When it is below 350 rpm, therefore, this "HIGH" signal is applied to the terminal S16 shown in FIG. 5 through the terminal S16 and the transistors T4 and T6 are turned off, as described already.

Next, the fail-safe circuit 213 will be explained.

This fail-safe circuit 213 effects open detection. The operational amplifier OP9 judges whether or not the background (BG) voltage is higher than 1 V within a certain range of revolution (at least 2,400 rpm). The potential at the (−) terminal of this operational amplifier OP9 is the reference voltage $V_{ref}$(3.6 V) plus 1 V. During normal operation, the BG voltage is at least 1 V at a number of revolutions of at least 2,400 rpm. When the input is open or short-circuited, however, the BG voltage becomes below 1 V and hence, detection can be made.

During the normal operation, the (+) input of the operational amplifier OP9 is greater and the HIGH signal is produced, so that the HIGH signal is applied to the base of the transistor T13 to turn it on. In other words, the collector output or the transistor T13 constitutes a NOR gate of the output of the comparator CO3 and the output of the operational amplifier OP9. When the engine speed is below 2,4000 rpm or the signal from the fail safe circuit 213 is normal, the transistor T13 is always kept turned on, no current is supplied to the transistor T7 hence, normal knock control is effected. When the engine speed is above 2,400 rpm and the signal from the fail safe circuit 213 is abnormal indicating the opening or short-circuiting of the knock sensor 100, the transistor T13 turns off and a current is supplied to the base of the transistor T7 through a resistor R300 and turns on the transistor T7. Thus a current $i_1$ flows through the output terminal of OP11→C18, C17→R63, and the output voltage of the operational amplifier OP11 rises to the maximum retard value.

In accordance with this embodiment, the sensor output signal and the background level (BGL) can be compared with each other as the values that are amplified with the same gain.

Figure 12:
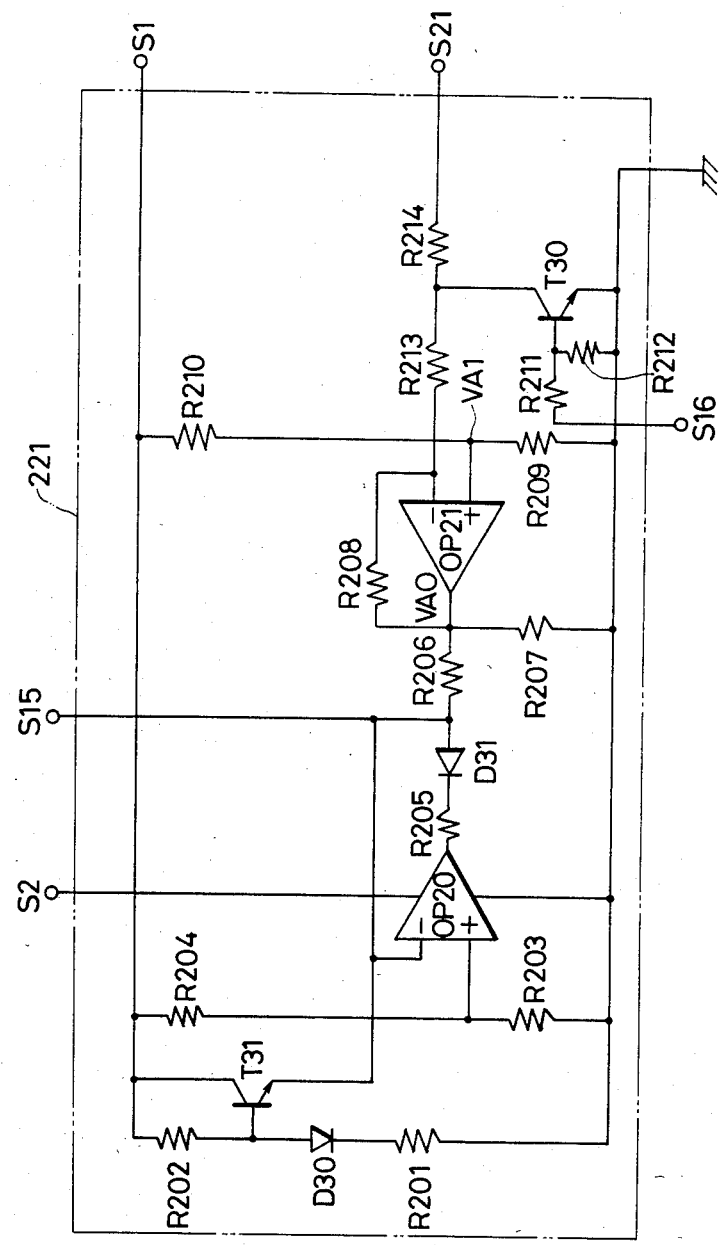
FIG. 12 is a circuit diagram showing in detail the lowest voltage generation circuit 221 shown in FIG. 1.

FIG. 12 shows in detail the lowest voltage generation circuit 221.

In the diagram, the terminal S21 is connected to the output of the atmospheric pressure sensor 700. The output terminal S16 is connected to the second number-of-revolution detection circuit 219 shown in FIG. 7, which detects 350 rpm or less of the engine. The terminals S1, S2 are connected to the respective power sources, and the output of this lowest voltage generation circuit is connected to the terminal S15 shown in FIG. 5 through the terminal S15.

An addition/subtraction circuit consisting of the resistors R214, R213, R208, R210, R209, R207 and the operational amplifier OP21 is connected to the terminal S21. The output of the operational amplifier OP21 is connected to the output terminal S15 through a protective resistor R206. Circuits for determining the maximum value and minimum value of the lowest voltage are connected to the terminal S15, respectively. In other words, the maximum value limit circuit consists of resistors R204, R203, R205, a diode D31 and an operational amplifier OP20, while the minimum value limit circuit consists of resistors R202, R201, a diode D30 and a transistor T31. The base of the transistor T30 is connected to the terminal S16 through the resistor R211, and the resistor R212 is connected between the base and emitter of the transistor T30. The emitter of this transistor T30 is grounded while this collector is connected to the junction of resistors R213 and R214.

The lowest voltage generation circuit having the construction described operates in the following manner.

Figure 13:
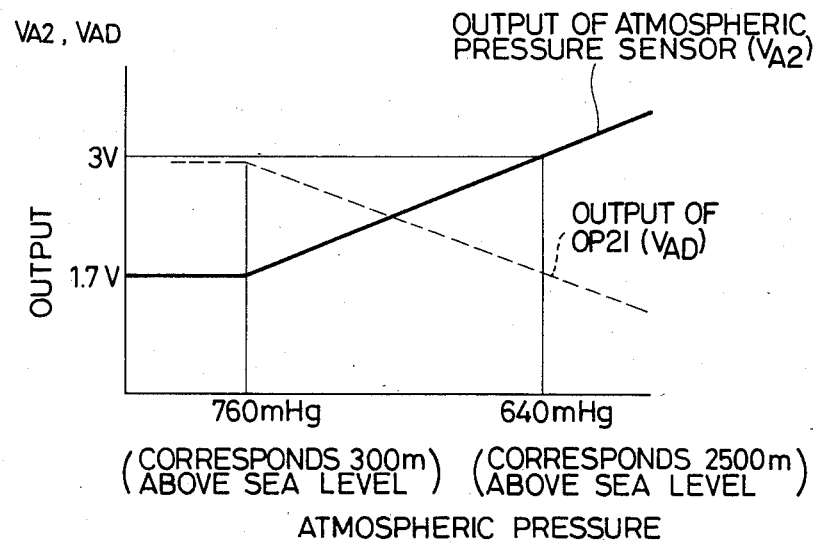
FIG. 13 is a diagram showing the output characteristics of the atmospheric pressure sensor 700 shown in FIG. 1.

As described already, the output of the atmospheric pressure sensor 700 is applied to the terminal S21 with the characteristics such as shown in FIG. 13 and to the (−) input terminal of the operational amplifier OP21 through the resistors R213 and R214. On the other hand, an intermediate voltage $V_{A1}$ between resistors R210 and R209, that are connected in series between the stabilized power terminal S1 and the ground, is applied to the (+) input terminal of the operational amplifier OP21. A resistor R208 is interposed between the (−) input terminal and output terminal of the operational amplifier OP21. Accordingly, the output volta $V_{Ao}$ of the operational amplifier OP21 becomes a voltage to and from which the intermediate voltage $V_{A1}$ is added or subtracted. This can be expressed by the following equation:

$$V_{Ao} = V_{A1}\left(1 + \frac{R208}{R213 + R214)}\right) - \left(\frac{R208}{R213 + R214}\right) \cdot V_{A2}$$

If the constants are set so that R208=R213+R214, $$V_{Ao} = 2V_{A1} - V_{A2}$$

Accordingly, the output voltage $V_{Ao}$ of the operational amplifier becomes the output whose voltage change per atmospheric pressure is equal to the output voltage of the atmospheric pressure sensor and whose gradient has negative characteristics as represented by broken line in FIG. 13. The absolute value of this output can be arbitrarily set by means of the intermediate voltage $V_{A1}$ between the resistors R210 and R209.

If the set value of $V_{A1}$ is 2.35 V, $V_{AO}=1.7$ V and 3 V when the output voltage $V_{A2}$ of the atmospheric pressure sensor 700 is 3 V and 1.7 V, respectively.

This output volta $V_{Ao}$ is applied to the terminal S15 of the knock signal voltage, onversion circuit 215 through the terminal S15 and to the (−) input terminal of the operational amplifier OP13 of the minimum voltage clamp circuit. Accordingly, the minimum clamp voltage becomes one that corresponds to the output voltage of the atmospheric pressure sensor 700.

On the other hand, when the output $V_{A2}$ of the atmospheric pressure sensor becomes too low or too high for some reason or other, the ignition timing becomes an excessive retard angle and an excessive advance angle and exerts adverse influences upon the driving performance of the engine. To prevent this problem, the minimum voltage $V_{SL}$ is set by minimum voltage setting resistors R202, R201 and a temperature-compensating diode D30 and is limited by the emitter follower circuit of a transistor T31, when the output is too low. When the output is too high, on the other hand, the maximum voltage is set by maximum voltage setting resistors R203, R204 and is applied to the (+) input terminal of the operational amplifier OP20 and the terminal S15 is applied to the (−) input terminal for the sake of comparison. When the output voltage of the terminal S15 (the output voltage $V_{Ao}$ of the operational amplifier OP21) is excessively higher than the set value, a current is allowed to flow to the output terminal of the operational amplifier OP20, through the diode D31 and the resistor R205, thereby limiting the maximum voltage.

At the start of the engine operation, the power source voltage is unstable and the output of the atmospheric pressure sensor is also unstable. In this case, if the construction is such that the ignition timing varies always with the output $V_{A2}$ of the atmospheric pressure sensor even at the start of the engine operation, the disadvantages such as the drop of startability and the like develop. To eliminate this problem, the present invention employs the resistor R213 and addition/subtraction circuit consisting of the resistors R210, R209, R208 and the operational amplifier OP21 so as to suitably set the clamp voltage at the start of operation. Namely, it receives the revolution signal via the terminal S16 to clamp the ignition timing irrespective of the output voltage of the pressure sensor at the start and when the number of revolutions is below a predetermined level (350 rpm or below=at the start), the transistor T30 is turned on to cut the output of the atmospheric pressure sensor from the terminal S21. Incidentally, the voltage in this case can be expressed by the following formula:

$$V_{Ao} = V_{A1}\left(1 + \frac{R208}{R213}\right)$$

Accordingly, the clamp voltage at the start can be set arbitrarily to a desired value by setting the resistor R213 to a suitable resistance value (with the proviso that the value is within the range of $V_{A1} < V_{Ao} \leq 2V_{A1}$).

In this embodiment, the value is set to 3 V.

In accordance with the present invention, therefore, the ignition timing control is made in the proximity of MBT (minimum burn timing) as shown in FIG. 16 when knock is occuring in the engine (See V letter a) and when no knock occurs in the engine, the ignition is effected at the maximum advance angle position corresponding to the lowest voltage clamp value of the output voltage of the knock control apparatus 200 Accordingly, even when MBT in at high altitude moves to an advance position greater than the maximum advance angle position in at low altitude due to the change of the atmospheric pressure (see letter b), the maximum advance angle position rises linearly in accordance with the atmospheric pressure and hence, knock control can be always made in the proximity of MBT.

When knocking is not occuring (no knocking operation), the ignition timing is situated at the maximum advance angle position clamped by the output of the knock control apparatus 200. Moreover, since the maximum advance angle position changes linearly in accordance with the output of the atmospheric pressure sensor, the drop of efficiency due to the excessive advance angle at low altitudes, which might occur when the maximum advance angle position at low altitudes is set to the maximum advance angle position at high altitudes (that is, when the altitude compensation is not effected for the maximum advance angle position), can be avoided.

In the present invention during knocking operation, the signal from the atmospheric pressure sensor is not directly applied to the phase control circuit in the retard circuit 502 which changes the ignition timing and the maximum advance angle clamp voltage of the knock control apparatus is adjusted. Accordingly, even when the output of the atmospheric pressure sensor changes abruptly to the generated voltage corresponding to the voltage at high altitutdes during knock operation, the advance angle changing speed is always kept constant through the time constant of the circuit formed by the resistors R55, R56, R57 and the capacitors C17, C18 shown in FIG. 5. This construction can eliminate the problems that occur when the output of the atmospheric pressure sensor abruptly changes to the voltage corresponding to the voltage at high altitudes, the change directly appearing as the change of the ignition timing with the ignition timing abruptly entering the knocking range to cause heavy knocking to occur and in the worst case, causing engine breakdown. These problems are expected in the construction in which the output of the atmospheric pressure sensor is directly applied to the phase control circuit.

Figure 14:
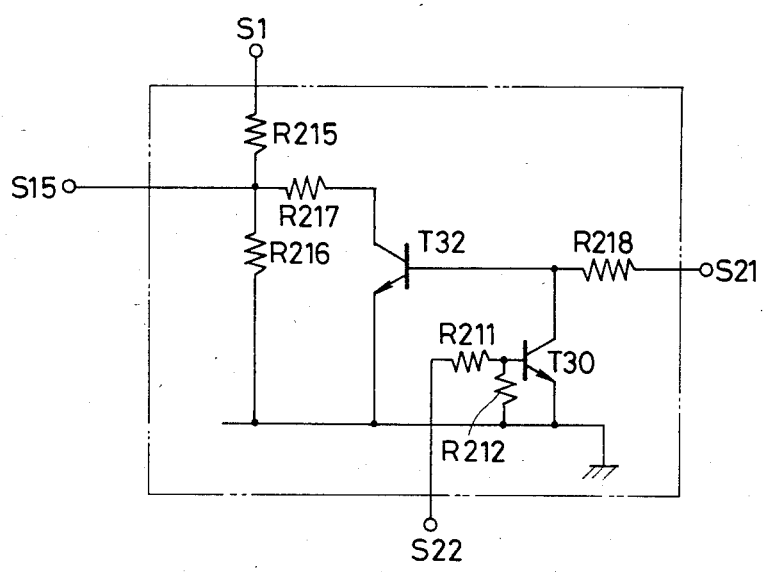
FIG. 14 is a circuit diagram showing in detail another embodiment of the lowest voltage generation circuit shown in FIG. 12.
Figure 15:
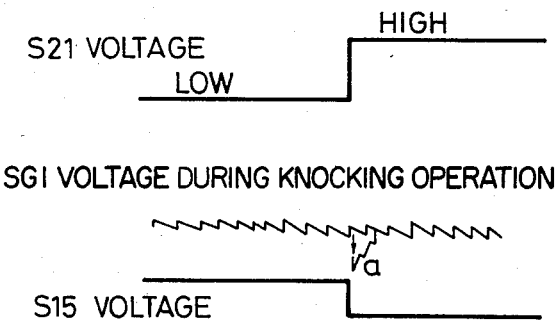
FIG. 15 is an operation diagram showing the operation of the lowest voltage generation circuit shown in FIG. 14.

In accordance with the present invention, therefore, the output signal from the atmospheric pressure sensor need not be linear. As shown in FIGS. 14 and 15 illustrating another embodiment of the invention, HIGH and LOW signals with an arbitrary point of the atmospheric pressure being the reference can be used for knock control at high altitude without any problem.

Another embodiment of the present invention shown in FIG. 14 will be explained briefly with reference to the operation diagram of FIG. 15. In the case of driving at low altitude, the output of the atmospheric pressure sensor (the voltage of S21) is assumed to be LOW and it is assumed to be HIGH in the case of high altitudes. Since the S21 voltage is LOW at low altitudes, the voltage S15 at the division point of the resistors R215 and R216 becomes the divided voltage of the S1 voltage by the resistors R215 and R216 because the transistor T32 whose base is connected to S21 is turned off and the resistor R217 becomes an open circuit. At high altitudes, the transistor T32 is turned on, on the contrary, so that the resistor R216 is connected in parallel with the resistor R217 and the S15 voltage becomes the divided voltage of the S1 voltage by the resistor R215 and the parallel circuit of the resistors R216 and R217.

The contact S15 is the maximum advance angle clamp voltage of the output circuit or the knocking signal voltage conversion circuit 215 as described in detail earlier. In this case, even if the S21 voltage (the output of the atmospheric pressure sensor) abruptly changes during knocking operation no influence is exerted upon the advance angle changing speed so that it becomes possible to prevent the ignition timing from entering abruptly in the knock range as shown in FIG. 15a.

As described above, the present invention adds altitude compensation to knock control so that the maximum advance angle position obtained by the knock control apparatus can change with the change of the atmospheric pressure. Hence, knock control can be made more accurately and more precisely. In other words, even when the atmospheric pressure changes and the knock occurrence range of the ignition timing changes, knock control can be made by following up such change so that the internal combustion engine can be controlled much more efficiently.

What is claimed is:

1. A knock control apparatus equipped with an altitude compensation function, comprising:
    a knock sensor fitted to an internal combustion engine for detecting the mechanical oscillation of said internal combustion engine caused by knocking to produce a signal indicating the intensity of knock;
    an atmopsheric pressure sensor detecting the atmospheric pressure;
    means for discriminating a background level signal from the output signal from said knock sensor;
    means for comparing the output signal from said knock sensor with the background level signal from said discrimination means and detecting the knock of said internal combustion engine and the intensity of said knock;
    means for generating a signal representing a maximum advance angle position in accordance with a detected atmospheric pressure; and
    ignition timing control means for setting and generating a first ignition timing signal representing the maximum advance angle position corresponding to the detected atmospheric pressure when no knocking in the internal combustion engine is occurring, and for generating a second ignition timing signal representing an advance angle position retarded from the maximum advance angle position changing with a predetermined retard angle changing speed in accordance with the detected knocking intensity when knocking in the internal combustion engine is occurring, the second ignition timing singal changing gradually toward the first ignition timing signal corresponding to the detected atmospheric pressure with a predetermined advance angle changing speed while changing away from the first ignition timing signal with the predetermined retard angle changing speed in accordance with a detected knocking intensity.

2. The knock control apparatus as defined in claim 1 wherein said atmospheric pressure sensor continuously detects the atmospheric pressure.

3. The kncok control apparatus as defined in claim 1 wherein said atmospheric pressure sensor detects the atmospheric pressure at a plurality of levels.

4. The knock control apparatus as defined in claim 1 wherein said ignition timing control means further generates a third ignition timing signal representing a predetermined advance angle position when the internal combustion engine is in a starting period.

5. The knock control apparatus as defined in claim 3 wherein said ignition timing control means further generates a third ignition timing signal representing a predetermined advance angle position when the internal combustion engine is in a starting period.

6. The knock control apparatus as defined in claim 1 wherein said ignition timing control means further processes a signal representing a maximum retard angle position for limiting the second ignition timing signal.

7. The knock control apparatus as defined in claim 3 wherein said ignition timing control means further receives and sets a signal representing a maximum retard angle position for limiting the second ignition timing signal.

8. The knock control apparatus as defined in claim 1, wherein said maximum advance angle position signal generating means further includes means for limiting the magnitude of the signal within a predetermined range.

9. The knock control apparatus as defined in claim 3, wherein said maximum advance angle position signal generating means further includes means for limiting the magnitude of the signal within a predetermined range.

* * * * *